United States Patent
Kim et al.

(10) Patent No.: US 8,253,902 B2
(45) Date of Patent: Aug. 28, 2012

(54) LIQUID CRYSTAL DISPLAY DEVICE AND METHOD FOR MANUFACTURING THE SAME

(75) Inventors: Kyeong Jin Kim, Gunpo-si (KR); Do Yeon Kim, Busan-si (KR)

(73) Assignee: LG Display Co., Ltd., Seoul (KR)

( * ) Notice: Subject to any disclaimer, the term of this patent is extended or adjusted under 35 U.S.C. 154(b) by 136 days.

(21) Appl. No.: 10/978,378

(22) Filed: Nov. 2, 2004

(65) Prior Publication Data

US 2005/0140886 A1 Jun. 30, 2005

(30) Foreign Application Priority Data

Dec. 30, 2003 (KR) .................. 10-2003-0100694

(51) Int. Cl.
*G02F 1/1337* (2006.01)
(52) U.S. Cl. ........................................... 349/129
(58) Field of Classification Search ........... 349/123–136
See application file for complete search history.

(56) References Cited

U.S. PATENT DOCUMENTS

| | | | |
|---|---|---|---|
| 5,824,377 A * | 10/1998 | Pirwitz et al. ................. 428/1.23 |
| 6,377,326 B2 * | 4/2002 | Kuo et al. ..................... 349/129 |
| 6,399,165 B1 * | 6/2002 | Kwon et al. ................... 428/1.2 |
| 6,424,398 B1 | 7/2002 | Taniguchi et al. | |
| 6,535,260 B1 * | 3/2003 | Tasaka et al. ................. 349/124 |
| 6,753,551 B2 * | 6/2004 | Cheng ............................. 257/79 |
| 6,853,425 B2 * | 2/2005 | Kim et al. ...................... 349/119 |
| 7,079,210 B2 * | 7/2006 | Um et al. ....................... 349/122 |
| 7,304,703 B1 * | 12/2007 | Takeda et al. ................. 349/129 |
| 2002/0006587 A1 * | 1/2002 | Kwon et al. ................... 430/321 |
| 2002/0063832 A1 * | 5/2002 | Wu et al. ....................... 349/129 |
| 2002/0080312 A1 * | 6/2002 | Yamaguchi et al. .......... 349/129 |
| 2002/0093718 A1 * | 7/2002 | Slack et al. .................... 359/246 |
| 2003/0020858 A1 * | 1/2003 | Kim et al. ...................... 349/129 |
| 2003/0059724 A1 * | 3/2003 | Choi ............................. 430/321 |
| 2003/0142257 A1 * | 7/2003 | Chaudhari et al. ............ 349/129 |
| 2003/0202146 A1 * | 10/2003 | Takeda et al. ................. 349/129 |
| 2004/0095538 A1 * | 5/2004 | Kim et al. ...................... 349/129 |
| 2004/0227883 A1 * | 11/2004 | Lee et al. ....................... 349/129 |
| 2005/0030459 A1 * | 2/2005 | Song et al. ..................... 349/129 |
| 2005/0140870 A1 * | 6/2005 | Kim et al. ...................... 349/114 |
| 2006/0152660 A1 * | 7/2006 | Tanaka et al. ................. 349/139 |

FOREIGN PATENT DOCUMENTS

| KR | 10-20000056511 A | 9/2000 |
|---|---|---|
| KR | 10-20010037225 A | 5/2001 |

* cited by examiner

*Primary Examiner* — Thanh-Nhan P. Nguyen
(74) *Attorney, Agent, or Firm* — Birch, Stewart, Kolasch & Birch, LLP

(57) ABSTRACT

A liquid crystal display device includes: a first substrate, wherein a pixel region is defined by a gate line and a data line, an electric field guide window is formed within the pixel region, and a first alignment layer is formed on the first substrate, the first alignment layer having a predetermined number of domains aligned in different directions on the pixel region; a second substrate facing the first substrate, and having a dielectric rib spaced apart by a predetermined distance from the electric field guide window, and a second alignment layer having a predetermined number of domains aligned in different directions; and a liquid crystal layer interposed between the first and the second substrates.

8 Claims, 7 Drawing Sheets

LIQUID CRYSTAL DISPLAY DEVICE AND METHOD FOR MANUFACTURING THE SAME

BACKGROUND OF THE INVENTION

1. Field of the Invention

The present invention relates to a liquid crystal display device, and more particularly, to a liquid crystal display device and method for manufacturing the same, capable of improving an aperture ratio and simplifying the manufacturing process.

2. Description of the Related Art

Liquid crystal display (LCD) devices have advantageous characteristics such as low voltage operation, low power consumption, a lightweight and slim profile, and full color. Accordingly, LCD devices are widely used for display windows of watches, in calculators, as computer monitors, monitors having television receiving functions, television sets, and hand-held terminals.

Currently, TN (Twisted Nematic) mode LCD devices, which are widely used, have narrow viewing angles. Accordingly, technologies for widening such a viewing angles are being studied. As an example of widening the viewing angle, there exist an In Plane Switching (IPS) mode LCD device and a Vertical Alignment (VA) mode LCD device.

IPS mode LCD device widens the viewing angle by forming a pixel electrode and a common electrode together, on a thin film transistor (TFT) substrate. The liquid crystal is operated by a lateral electric field in a horizontal direction. However, IPS mode LCD devices have a problem in that their aperture ratio is lowered due to their structural characteristics.

VA mode LCD devices use a negative-type liquid crystal having a negative (−) dielectric anisotropy. In such devices, when a voltage is not applied, a longer axis direction of a liquid crystal molecule is arranged perpendicularly with respect to a plane of an alignment layer, and when the voltage is applied, the liquid crystal molecule is arranged in parallel on the plane of the alignment layer. An image is displayed by adjusting light transmittance using this property.

VA mode LCD devices distorts the electric field applied to the liquid crystal layer by forming, on the substrate, an auxiliary electrode, an electric field guide window, and a dielectric rib, and aligns a director of the liquid crystal molecule using the distorted electric field, thereby widening the viewing angle.

FIG. 1 is a plan view of a unit pixel of a VA mode LCD device according to the related art, and FIG. 2 is a cross-sectional view taken along line I-I' of FIG. 1. Referring to FIGS. 1 and 2, the VA mode LCD device includes: first and second substrates 1 and 2; a gate line 7 and a data line 9 respectively formed in horizontal and vertical directions on the first substrate 1 to define a pixel region; a pixel electrode 13 divided into a plurality of electrodes by an electric field guide window 14 formed on the pixel region; an auxiliary electrode 11 formed on the same layer as the gate line 7; a gate insulating layer 3 formed on the first substrate 1 including the gate line 7; a passivation layer 5 formed on the gate insulating layer 3 including the data line 9; a black matrix layer 4 formed on the second substrate 2; a color filter layer 6 formed on the second substrate 2 including the black matrix 4; a common electrode 8 formed on the color filter layer 6; a dielectric rib 10 formed on the common electrode 8; a liquid crystal layer 20 interposed between the first and the second substrates 1 and 2; a first alignment layer 15 formed on the passivation layer 5 including the pixel electrode 13; and a second alignment layer 12 formed on the common electrode 8.

The first and the second alignment layers 15 and 12 may be alignment-processed using a polyamide or polyimide-based compound, Polyvinylalcohol (PVA), polyamic acid and the like. Here, on any of the first and the second alignment layers 15 and 12, a multi-domain that is alignment-processed in a plurality of directions, may be formed. The LCD device that is alignment-processed in the multi-domain in this manner is called a multi-domain vertical alignment (MVA) mode LCD device. The VA mode LCD device that will be described below denotes a MVA mode LCD device.

In the VA mode LCD device according to the related art, when an electric field is generated between the pixel electrode 13 formed on the first substrate 1 and the common electrode 8 formed on the second substrate 2, a fringe field is formed by the electric field guide window 14 and the dielectric rib 10 so that the liquid crystals are aligned differently depending on the fringe field, whereby the viewing angle is compensated in the sense that the alignment angle or the direction of the liquid crystal molecules can be controlled by using the voltage applied to the auxiliary electrode 11 formed on the first substrate 1.

In the related art VA mode LCD device, to align liquid crystal molecules at a desired direction by the fringe field, an interval has to be kept between the electric field guide window 14 and the dielectric rib 10 within 25 μm. The narrow interval between the electric field guide window 14 and the dielectric rib 10 may cause drawbacks in that the aperture ratio is deteriorated and a stable texture is hard to obtain.

In order to form multi-domains in the related art VA mode LCD device having the multi-domains, it is necessary to provide masks corresponding to the number of the multi-domains to be formed. A corresponding process related with use of each of the masks is performed. For example, to form a multi-domain aligned in four different directions, it is necessary to provide four masks. The provided four masks are respectively used in four processes such that multi-domains each having four different alignment directions can be formed. To this end, the number of the masks increases in proportion to the increase of the number of the domains, causing the manufacturing costs to be increased and the manufacturing process to be complicated.

SUMMARY OF THE INVENTION

Accordingly, the present invention is directed to an LCD device and method for manufacturing the same that substantially obviates one or more problems caused by limitations and disadvantages of the related art.

An object of the present invention is to provide an LCD device and method for manufacturing the same that can improve an aperture ratio by increasing an interval between an electric field guide window and a dielectric rib.

Another object of the present invention is to provide an LCD device and method for manufacturing the same that can simplify the manufacturing method by forming a plurality of domains at the same time in a first alignment layer or a second alignment layer.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided an LCD device including: a first substrate, wherein a pixel region is defined by a gate line and a data line, an electric field guide window is formed within the pixel region, and a first alignment layer is formed on the first substrate, the first alignment layer having a predetermined number of domains aligned in different directions; a second substrate facing the first substrate, and having a dielectric rib spaced apart by a predetermined distance from the electric field guide window, and a second alignment layer having a predetermined number of domains aligned in different directions; and a liquid crystal layer interposed between the first and the second substrates.

The first alignment layer may have at least two domains, and the second alignment layer may have at least two domains.

Preferably, the domains formed in the first alignment layer have different directions from those formed in the second alignment layer.

Preferably, the dielectric rib is spaced apart by a distance range of about 30-70 μm from the electric field guide window, so that aperture ratio can be improved.

According to another aspect of the present invention, there is provided a method for manufacturing an LCD device, the method including: forming a first alignment layer on a first substrate using a first mask, the first alignment layer having a predetermined number of domains aligned in different directions; forming a second alignment layer on a second substrate using a second mask, the second alignment layer having a predetermined number of domains aligned in different directions; and attaching the first substrate and the second substrate such that the first substrate faces the second substrate.

The first alignment layer may be formed by irradiation using a 2-way unpolarized ultraviolet ray source that provides a bi-directional unpolarized ultraviolet ray, and the second alignment layer may be formed by irradiation using a 2-way unpolarized ultraviolet ray source that provides a bi-directional unpolarized ultraviolet ray.

Preferably, the first mask is the same as the second mask. Thus, by forming the first and second alignment layers using the same mask, manufacturing costs can be saved and the manufacturing process can be simplified.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to preferred exemplary embodiments of the present invention, examples of which are illustrated in the accompanying drawings.

Figure 1:
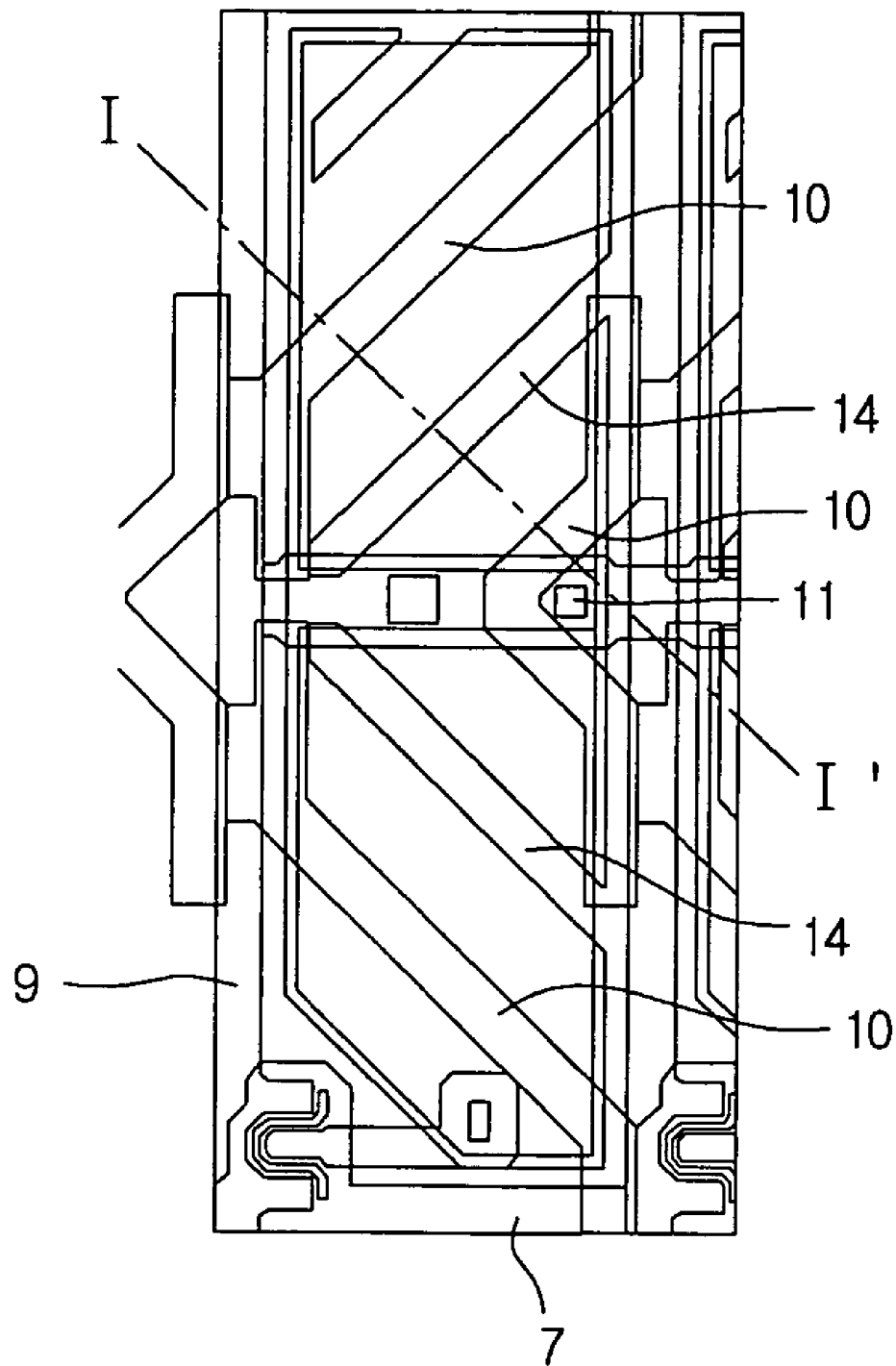
FIG. 1 is a plan view of a unit pixel of a VA mode LCD device according to the related art.
Figure 2:
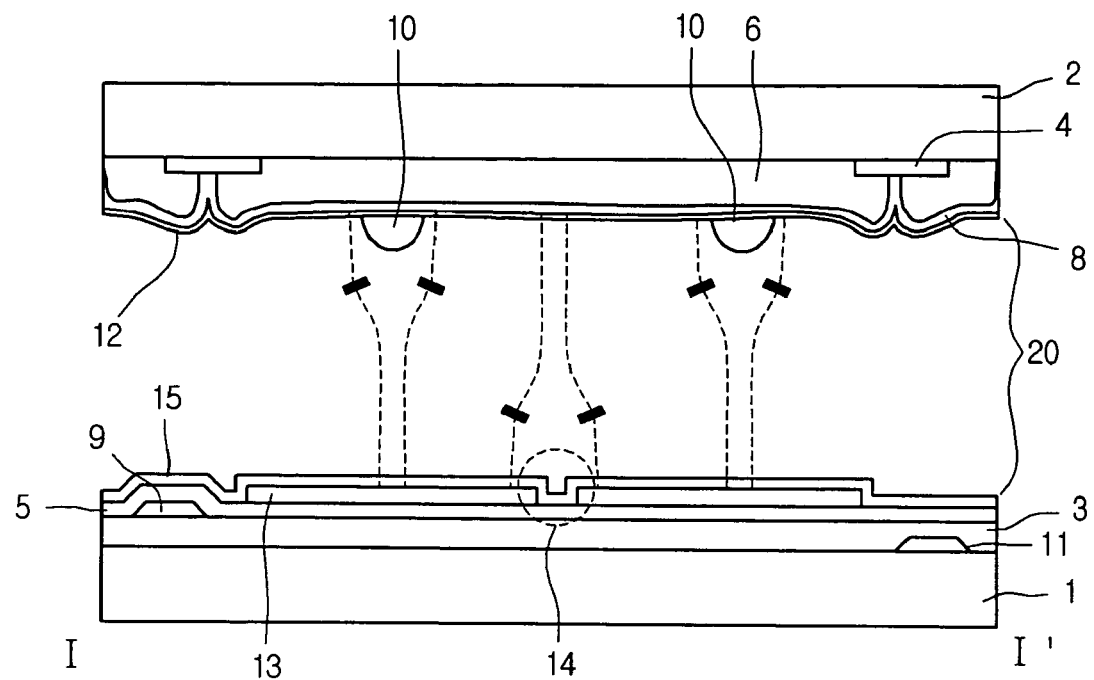
FIG. 2 is a cross-sectional view taken along the line I-I' of FIG. 1.
Figure 3:
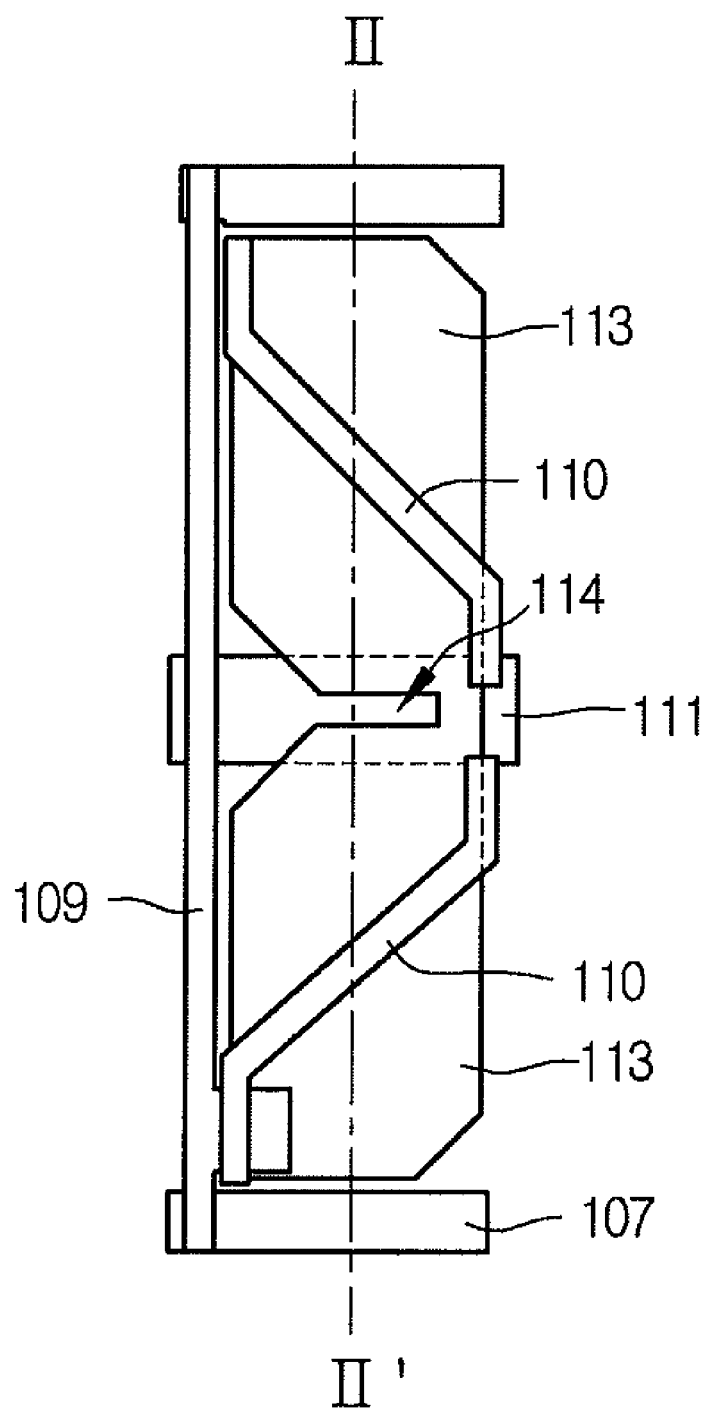
FIG. 3 is a plan view of a unit pixel of a VA mode LCD device according to a preferred exemplary embodiment of the present invention.
Figure 4:
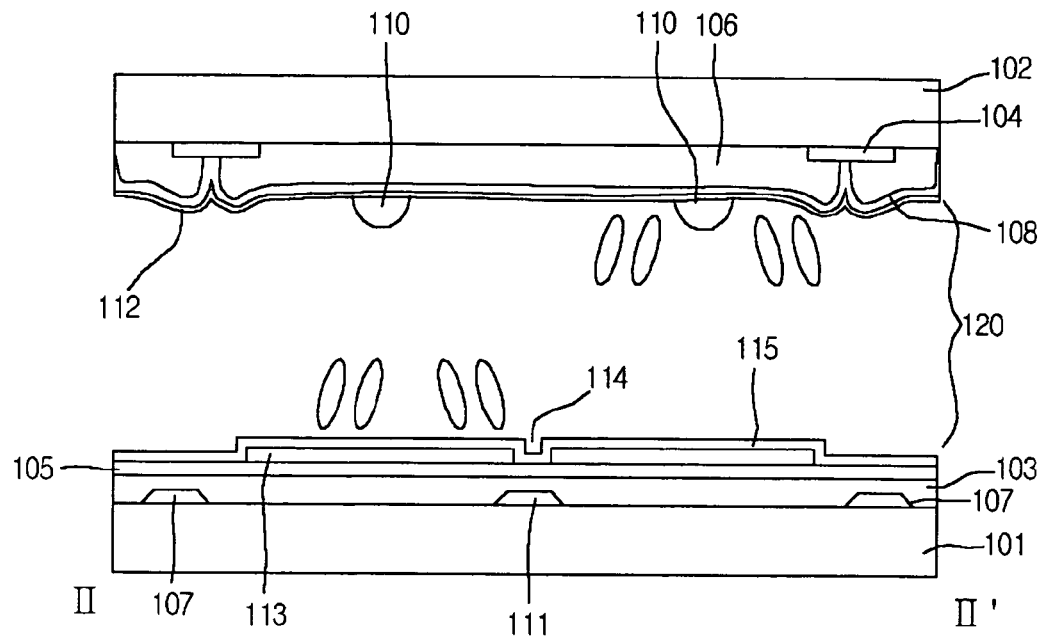
FIG. 4 is a cross-sectional view taken along the line II-II' of FIG. 3.

FIG. 3 is a plan view of a unit pixel of a VA mode LCD device according to a preferred exemplary embodiment of the present invention, and FIG. 4 is a cross-sectional view taken along the line II-II' of FIG. 3.

Referring to FIGS. 3 and 4, the VA mode LCD device includes a first substrate 101, a second substrate 102 facing the first substrate 101, and a liquid crystal layer 120 interposed between the first substrate 101 and the second substrate 102. The first substrate 101 includes a gate line 107 and a data line 109, which are respectively formed thereon in a horizontal direction and a vertical direction to define a pixel region, a pixel electrode 113 divided into two or more electrodes by an electric field guide window 114 formed on the pixel region, an auxiliary electrode 111 formed in the same layer as the gate line 107, a gate insulating layer 103 formed on the first substrate 101 including the gate line 107, and a passivation layer 105 formed on the gate insulating layer 103 including the data line 109. The second substrate 102 includes a black matrix layer 104 formed on the second substrate 102, a color filter layer 106 formed on the second substrate 102 including the black matrix layer 104, a common electrode 108 formed on the color filter layer 106, and a dielectric rib 110 formed on the common electrode 108. The first substrate 101 also includes a first alignment layer 115 in which at least two domains are aligned and formed in the pixel region, and the second substrate 102 also includes a second alignment layer 112 in which at least two domains are aligned and formed in the pixel region.

Alternatively, the VA mode LCD device may further include a phase difference film (not shown) formed on an outer surface of any of the first substrate 101 and the second substrate 102. The phase difference film compensates for a viewing angle in the direction perpendicular to the substrate and the direction according to the change of the viewing angle, thereby enlarging the region having no gray inversion and enhancing the contrast ratio in a diagonal direction of the substrate. The phase difference film can be formed of a negative uniaxial film having one optical axis or a negative biaxial film having two optical axes. It is preferable that the phase difference film is of the negative biaxial film type to achieve this result over a wide viewing angle.

The VA mode LCD device according to the present invention may further includes first and second polarizing plates (not shown) formed on outer surfaces of the first and second substrates 101 and 102. The first and second polarizing plates may be formed integrally with the phase difference film.

A plurality of dielectric ribs 110 are formed corresponding to the plurality of pixel electrodes divided by the electric field guide window 114. The dielectric ribs 110 are formed in a diagonal within the pixel region. The electric field guide window 114 is formed parallel to the auxiliary electrode 111 within the pixel region. The permittivity of the dielectric rib 110 is preferably the same as or less than that of the liquid crystal of the liquid crystal layer. Also, the dielectric rib 110 can be formed of a photosensitive material, such as photo-acrylate or Benzocyclobutene (BCB).

An interval between the dielectric rib 110 and the electric field guide window 114 is preferably in a range of about 30-70 μm. More preferably, a distance between the dielectric rib 110 and the electric field guide window 114 may be about 50 μm.

Thus, by increasing the interval between the dielectric rib 110 and the electric field guide window 114 compared with in the related art, the aperture ratio can be improved.

Although not shown in the drawings, a thin film transistor (TFT) functioning as a switching element is formed at a crossing point of the gate line 107 and the data line 109 on the first substrate 101, and the pixel electrode 113 is connected with a drain electrode of the TFT.

In various exemplary embodiments, the liquid crystal of the liquid crystal layer is doped with chiral dopant such that liquid crystal molecules are aligned and optical axes are continuously formed when an electric filed is applied to the liquid crystal. Also, in various exemplary embodiments, the common electrode 108 is formed of indium tin oxide (ITO).

In various exemplary embodiments, gate insulating layer 103 and the passivation layer 105 may be formed of materials such as BenzoCycloButene (BCB), acrylic resin, polyamide compound, SiNx, SiOx or the like.

Herein, the gate line 107, the data line 109, the black matrix layer 102, the color filter layer 106 and the like may be modified within a range that those skilled in the art can embody with ease.

The pixel electrode 113 is divided into two or more sub-pixel electrodes per unit pixel region by the electric field guide window 114. In various exemplary embodiments, the pixel electrode 113 may be formed of ITO or indium zinc oxide (IZO).

As the number of the electric field guide windows 114 increases, display performances such as response rate, driving voltage are enhanced, but at the same time the aperture ratio is reduced. Accordingly, it is necessary to properly adjust the number of the electric field guide windows 114.

The first and second alignment layers 115 and 112 may be formed by a photo-aligning treatment using a photo-reactive material such as polyvinylcinnamate-(PVCN), polysiloxane-cinnamate-(PSCN) or cellulosecinnamate-(CelCN) based compound. At least two domains can be aligned and formed in each of the first and second alignment layers 115 and 112. For example, two domains having different alignment directions can be formed in the first alignment layer 115. Also, two domains having different alignment directions can be formed in the second alignment layer 112. Accordingly, at least four domains can be formed in the first and second alignment layers 115 and 112. In various exemplary embodiments, the four domains have different alignment directions from one another. Although in various exemplary embodiments of the present invention two domains are formed in each of the first and second alignment layers 115 and 112, more than two domains may be formed if desired.

Figure 5A:
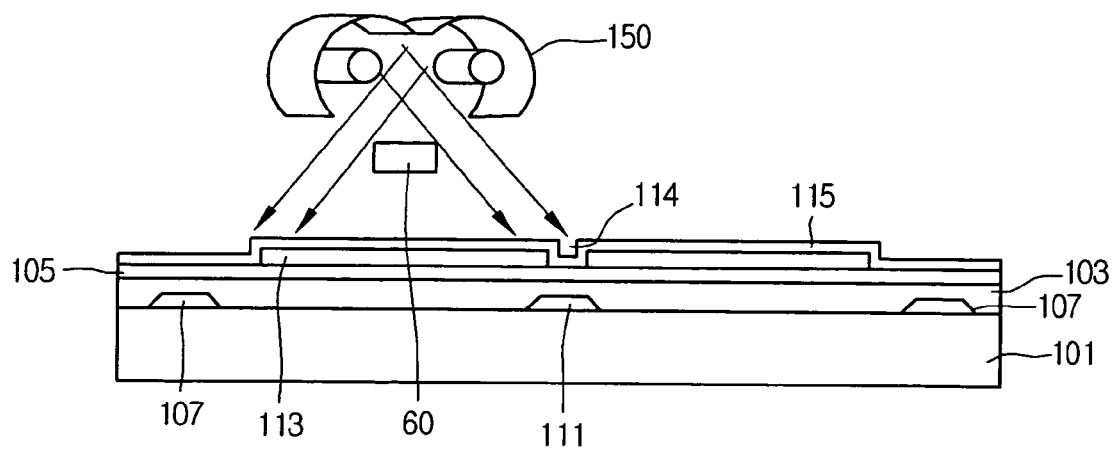
FIGS. 5A and 5B are schematic views illustrating forming of an alignment layer in a VA mode LCD device according to a preferred exemplary embodiment of the present invention.
Figure 5B:
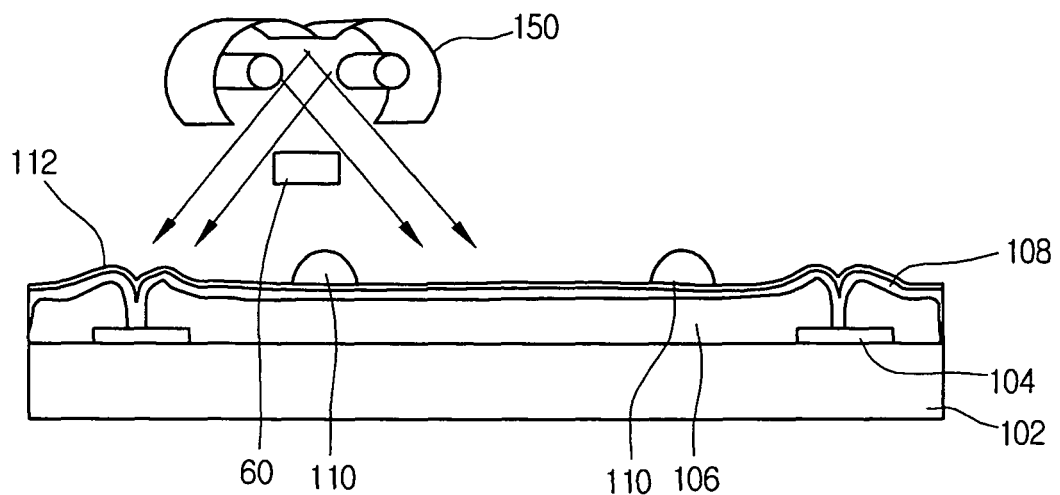

FIGS. 5A and 5B illustrate a method for forming an alignment layer in a VA mode LCD device according to a preferred exemplary embodiment of the present invention.

Referring to FIG. 5A, an alignment material is formed on a first substrate 101 including a pixel electrode 113 formed thereon, and a bi-directional unpolarized ultraviolet (UV) ray is irradiated onto the alignment material using 2-way unpolarized UV light source 150 and a mask 60, thereby forming a first alignment layer 115. The bi-directional unpolarized UV ray is directed in different directions.

Figure 6:
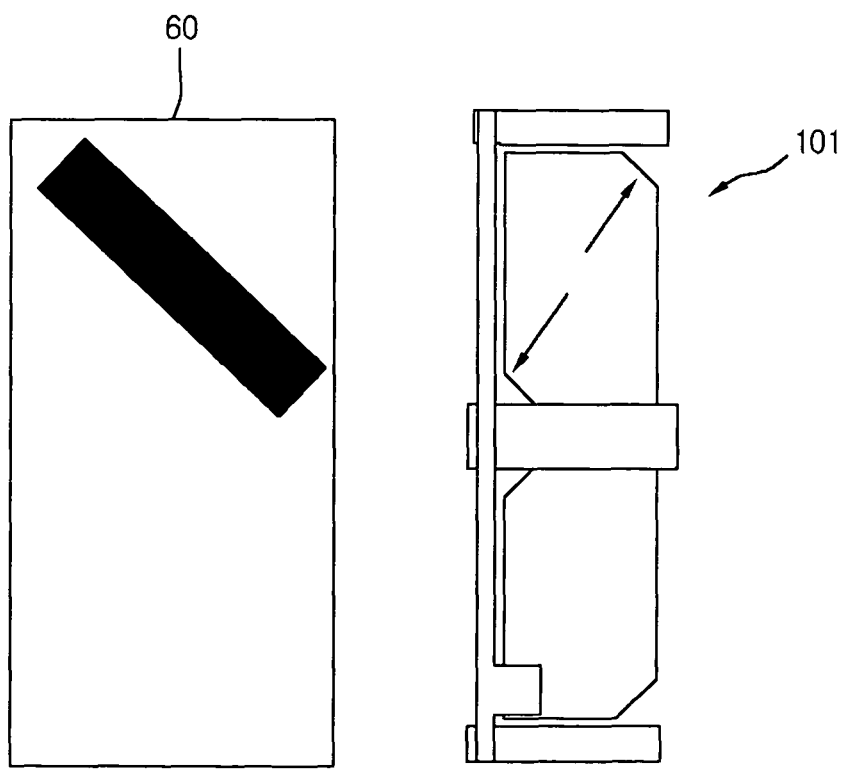
FIG. 6 is a schematic view illustrating a multi-domain formed on a first substrate by the method of FIG. 5A.

The bidirectional unpolarized UV ray irradiates the alignment material simultaneously while moving in a selected direction along the first substrate 101, so that a first alignment layer 115 having a first domain aligned in a first direction and a second domain aligned in a second direction is formed on the pixel region as shown in FIG. 6.

In the above case, when the photo-aligning treatment is performed by simultaneous irradiation of the UV rays, LC material pretilt angle, LC material alignment direction and LC material pretilt direction are determined at the same time.

Referring to FIG. 5B, an alignment material is formed on a common electrode 108 of a second substrate 102, and a bi-directional unpolarized UV ray is irradiated onto the alignment material using 2-way unpolarized UV light source 150 and the mask 60, thereby forming a second alignment layer 112. The 2-way unpolarized UV light source 150 provides light rays directed in different directions.

Figure 7:
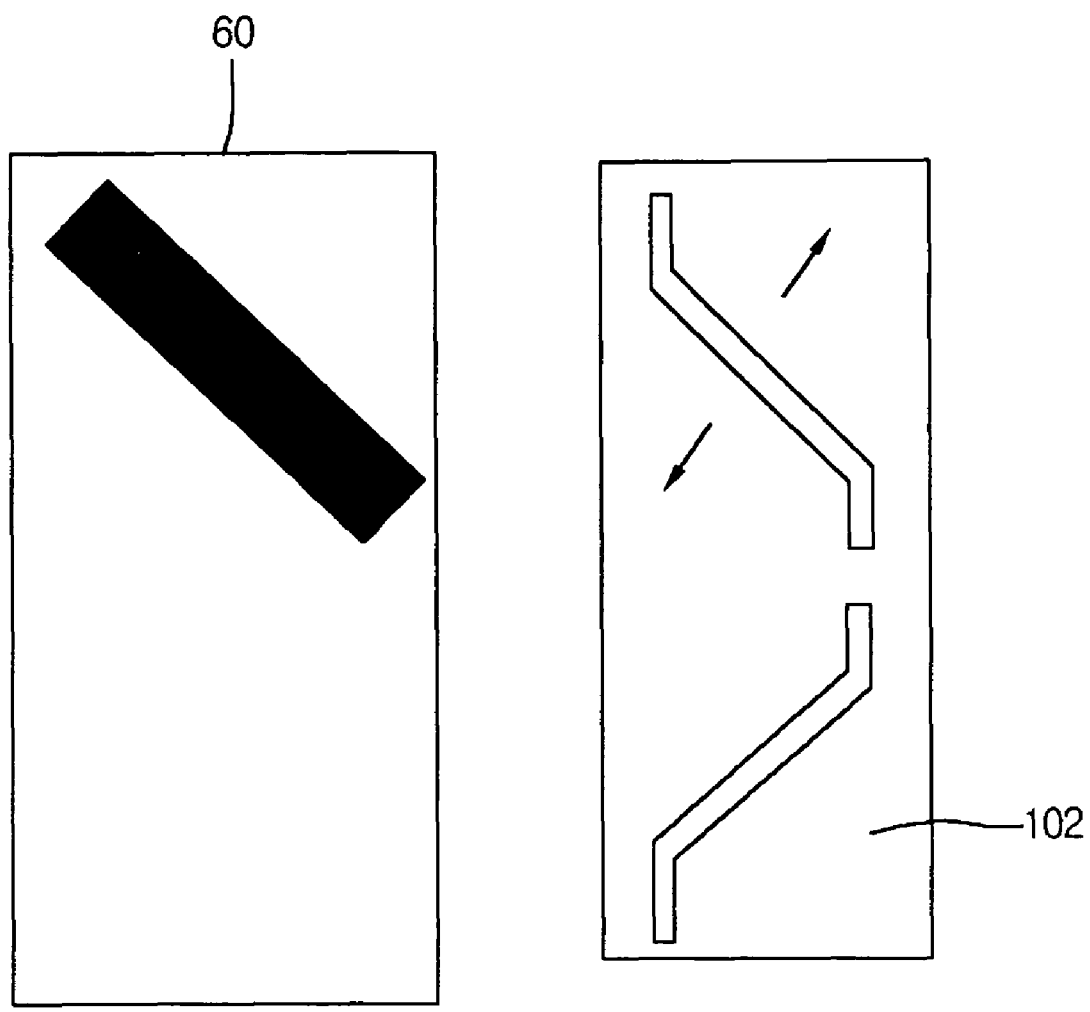
FIG. 7 is a schematic view illustrating a multi-domain formed on a second substrate by the method of FIG. 5B.

As in forming the first alignment layer 115, the same mask 60 is used in forming the second alignment layer 112, and the same bi-directional unpolarized UV ray is irradiated, so that the second alignment layer 112 having a third domain aligned in a third direction and a fourth domain aligned in a fourth direction is formed on the pixel region as shown in FIG. 7.

In other words, two domains are aligned and formed in the first alignment layer 115 and two domains are aligned and formed in the second alignment layer 112. As a result, four domains are aligned and formed using the same bi-directional unpolarized UV ray and the same mask 60. In the related art, four processes using four different masks are performed so as to form four domains. Hence, the method of the related art increases the manufacturing costs due to the increase of the number of the masks, and makes the alignment process complicated due to an increased of process steps. Unlike in the related art, in the VA mode LCD device according to the present invention, since two domains are aligned and formed in the first alignment layer 115 and two domains are aligned and formed in the second alignment layer 112, a total of four domains are aligned and formed using one mask, which enables costs to be saved and the manufacturing process to be simplified.

Figure 8:
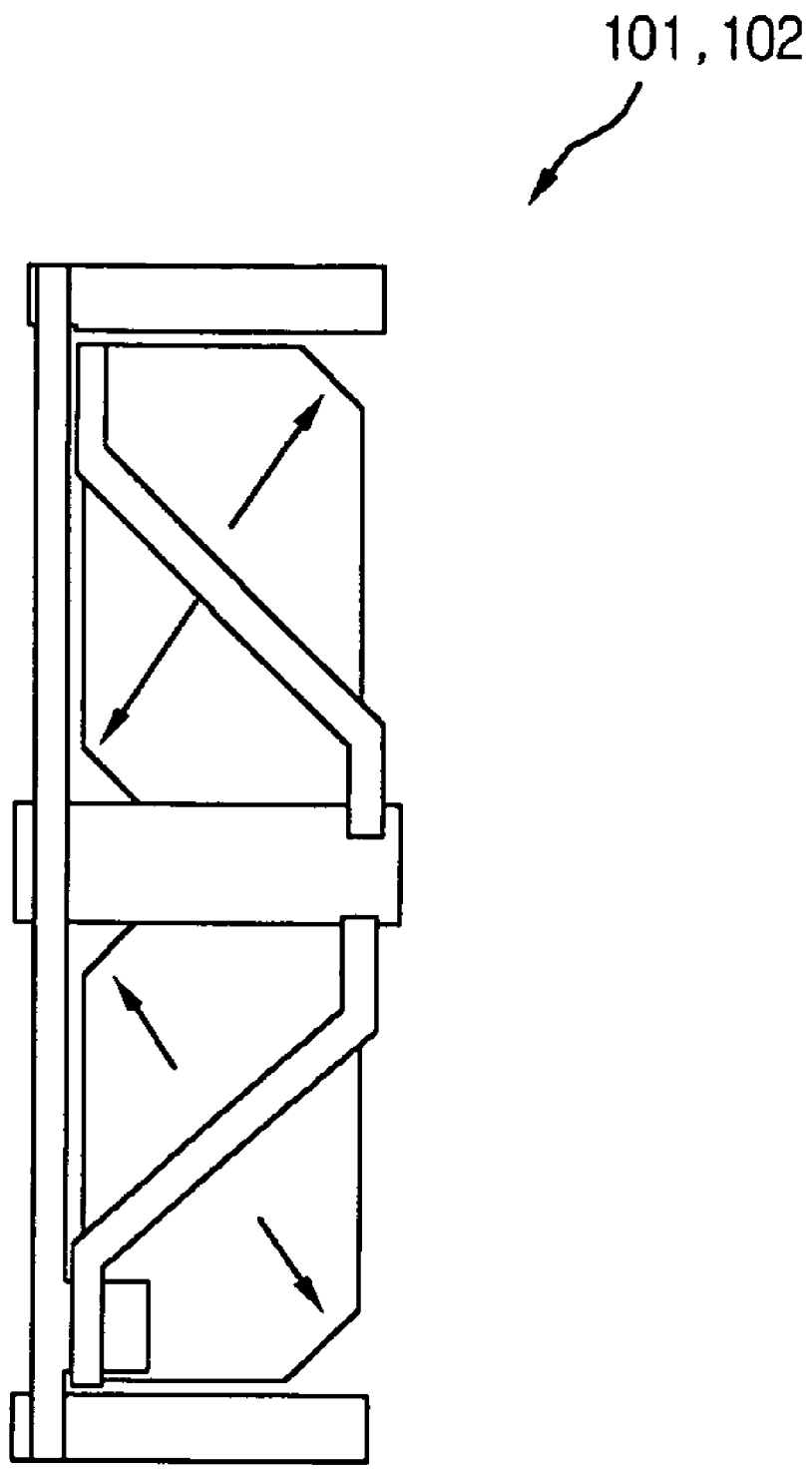
FIG. 8 is a schematic view illustrating that substrates having the multi-domains formed in FIGS. 6 and 7 are attached.

FIG. 8 shows that substrates having multi-domains shown in FIGS. 6 and 7 are attached.

As shown in FIG. 8, the first substrate 101 in which two domains are aligned and formed and the second substrate 102 in which two domains are aligned and formed are attached to each other facing each other. Because the first substrate 101 and the second substrate 102 are attached such that the two domains formed on the second substrate 102 face the two domains formed on the first substrate 101, the four domains have different alignment directions.

As described above, according to the present invention, by widening the interval between the electric field guide window and the dielectric rib, the aperture ratio can be improved.

Also, since at least two domains are formed in each of the first and second alignment layers using one mask, total four or more domains can be formed, thereby saving the manufacturing costs and simplifying the manufacturing process.

Further, because the first and second alignment layers provide a pretilt to the LC material, more stable texture can be realized.

It will be apparent to those skilled in the art that various modifications and variations can be made in the present invention. Thus, it is intended that the present invention covers modifications and variations of this invention provided they come within the scope of the appended claims and their equivalents.

What is claimed is:

1. A liquid crystal display device comprising:
a first substrate, wherein a pixel region is defined by a gate line and a data line, an auxiliary electrode is formed in the same layer as the gate line and parallel to the gate line, an electric field guide window is formed parallel to the auxiliary electrode within the pixel region, a pixel electrode that is divided into two or more sub-pixel electrodes by the electric field guide window, and a first alignment layer includes more than two domains, a first and a second of which are aligned in opposite alignment directions;
a second substrate facing the first substrate, wherein a dielectric rib is formed in a diagonal within the pixel region, and a second alignment layer includes more than two domains including third and fourth domains aligned in opposite alignment directions; and
a liquid crystal layer interposed between the first and the second substrates,
wherein when the first substrate and the second substrate are attached, the first to fourth domains are aligned to first to fourth alignment directions different from one another within the pixel region, and
wherein the dielectric rib is disposed on a flat portion of the sub-pixel electrode parallel to the first substrate.

2. The liquid crystal display device according to claim 1, wherein the domains formed in the first alignment layer has different alignment directions from those formed in the second alignment layer.

3. The liquid crystal display device according to claim 1, wherein the first and second domains are aligned in opposite alignment directions based on the dielectric rib.

4. The liquid crystal display device according to claim 1, wherein the electric field guide window includes a gap between the sub-pixel electrodes.

5. A method for manufacturing an LCD device, the method comprising:
generating two ultraviolet rays crossing each other to different directions generated from a 2-way unpolarized UV light source itself;
forming a first alignment layer on a first substrate by irradiating the two ultraviolet rays through a first mask, the first alignment layer having at least two domains aligned in at least two directions, the at least two directions being different from one another;
generating two ultraviolet rays crossing each other to different directions generated from a 2-way unpolarized UV light source itself;
forming a second alignment layer on a second substrate by irradiating the two ultraviolet rays through a second mask, the second alignment layer having at least two domains aligned in at least two directions, the at least two directions being different from one another; and
attaching the first substrate and the second substrate such that the first substrate faces the second substrate,
wherein the first and second alignment layers are formed of a cellulosecinnamate (CelCN) based compound,
wherein the first substrate in which two domains are aligned and the second substrate in which two domains are aligned are attached such that the two domains formed on the second substrate face the two domains formed on the first substrate to form four domains have different alignment directions.

6. The method according to claim 5, wherein the first mask is the same as the second mask.

7. The method of claim 5, further comprising:
forming the first alignment layer to have more than two domains at least two of which are aligned in at least two directions, the at least two directions being different from one another; and
forming the second alignment layer to have more than two domains at least two of which are aligned in at least two directions, the at least two directions being different from one another;
wherein the first substrate in which at least two domains are aligned and the second substrate in which at least two domains are aligned are attached such that the at least two aligned domains formed on the second substrate face at least two aligned domains formed on the first substrate to form at least four domains which have different alignment directions.

8. A liquid crystal display device comprising:
a first substrate, wherein a pixel region is defined by a gate line and a data line, an auxiliary electrode is formed in the same layer as the gate line and parallel to the gate line, an electric field guide window is formed parallel to the auxiliary electrode within the pixel region, a pixel electrode is divided into two or more sub-pixel electrodes by the electric field guide window, and a first alignment layer includes more than two domains including first and second domains aligned in opposite alignment directions;
a second substrate facing the first substrate, wherein a dielectric rib is formed in a diagonal direction within the pixel region and a second alignment layer includes more than two domains including third and fourth domains aligned in opposite alignment directions; and
a liquid crystal layer interposed between the first and the second substrates,
wherein when the first substrate and the second substrate are attached, the first to fourth domains are aligned to first to fourth alignment directions different from one another within the pixel region, and
wherein the dielectric rib is disposed on a non-stepped sub-pixel electrode parallel to the first substrate.

* * * * *